United States Patent
Wiesinger et al.

(10) Patent No.: US 7,311,005 B2
(45) Date of Patent: Dec. 25, 2007

(54) METHOD AND DEVICE FOR CONTINUOUS MEASURING OF DYNAMIC FLUID CONSUMPTION, INCLUDING PRESSURE REGULATOR

(75) Inventors: Michael Wiesinger, Graz (AT); Ferdinand Purkathofer, St. Radegund (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/804,234

(22) Filed: Mar. 19, 2004

(65) Prior Publication Data

US 2004/0211263 A1    Oct. 28, 2004

(30) Foreign Application Priority Data

Mar. 21, 2003    (AT)    ........................ GM198/2003 U

(51) Int. Cl.
*G01L 7/00*    (2006.01)
(52) U.S. Cl. ...................................................... 73/714
(58) Field of Classification Search .............. 73/119 A, 73/118.1, 113, 112, 716, 861.354, 714; 137/505.12, 137/505.11
See application file for complete search history.

(56) References Cited

U.S. PATENT DOCUMENTS

| | | | | |
|---|---|---|---|---|
| 3,924,408 A | * | 12/1975 | Beiswenger et al. | .......... 60/290 |
| 4,070,070 A | * | 1/1978 | Eggers | ..................... 303/116.3 |
| 4,612,895 A | * | 9/1986 | Kuroiwa et al. | ............ 123/494 |
| 4,648,553 A | * | 3/1987 | Muller | ...................... 236/80 R |
| 5,469,747 A | * | 11/1995 | Carlisle et al. | ........ 73/861.355 |
| 6,041,664 A | * | 3/2000 | Hafner | .................. 73/861.353 |
| 6,318,405 B1 | * | 11/2001 | Brandt et al. | ............. 137/484.2 |
| 6,554,017 B2 | * | 4/2003 | Berger | ...................... 137/116.5 |
| 6,668,855 B2 | * | 12/2003 | Heald et al. | ........... 137/505.26 |
| 6,758,234 B2 | * | 7/2004 | Bradley | ...................... 137/102 |
| 6,820,641 B2 | * | 11/2004 | Larsen | ........................ 137/491 |
| 2001/0009161 A1 | * | 7/2001 | Berger | ...................... 137/116.5 |
| 2004/0149336 A1 | * | 8/2004 | Wiederkehr et al. | ... 137/505.11 |

* cited by examiner

*Primary Examiner*—Max Noori
(74) *Attorney, Agent, or Firm*—Dykema Gossett PLLC

(57) ABSTRACT

In a method for continuous measuring of dynamic fluid consumption, particularly fuel, the pressure beyond the flow sensor is adjusted to a constant value by means of a pressure regulator by using a continuously-operating flow sensor with variable pressure drop, preferably a mass flow sensor. Fluid is guided into the pressure regulator after exceeding a discretionary pressure to allow continuous, accurate, as well timely and highly discriminating consumption measuring with regulated exit pressure for the fluid even at a back-flow of short duration or during temperature-related expansion of the fluid. A pressure regulator (9) provided for this purpose has a housing (41, 42), which contains an element (40) biased by a changeable force whereby the element (40) is coupled to a valve arrangement (49, 50) that is also arranged in the housing (41, 42) for the fluid to build up pressure therein. The pressure regulator (9) contains a catch volume for the fluid.

12 Claims, 3 Drawing Sheets

METHOD AND DEVICE FOR CONTINUOUS MEASURING OF DYNAMIC FLUID CONSUMPTION, INCLUDING PRESSURE REGULATOR

BACKGROUND OF THE INVENTION

1. Field of the Invention

The invention relates to a method for continuous measuring of dynamic fluid consumption, particularly of fuel, by means of a continuously-operating flow sensor with variable pressure drop, preferably a mass flow sensor, whereby the pressure beyond the flow sensor is adjusted to a constant value by means of a pressure regulator. The invention addresses furthermore a pressure regulator having a housing, which contains an element biased by a changeable force acting against the pressure to be regulated whereby Pie this element is coupled to a valve arrangement that is also arranged in the housing for the pressure build up of the fluid therein. The invention relates also to a device for continuous measuring of dynamic fluid consumption, particularly of fuel, comprising a tank, possibly a fuel conditioning system, and preferably a controllable pump, a continuously-operating flow sensor for the fluid, preferably a Coriolis sensor, and a initial-pressure regulator for the admission pressure between the flow sensor and the fluid consumer.

2. The Prior Art

Intermittently operating systems based on scales are known in the art for measuring consumption of fluids, especially in the application of fuel consumption of engines on test benches. They have the advantage of being open systems, namely they have the characteristic whereby fuel can be delivered from the measuring system and returned to the system at limited time-intervals and limited volume. The dispensed amount of fuel as well as the returned fuel amount are measured and taken into account in the consumption reading. Open systems are advantageous especially for modern injection systems since they force fuel back at the start of the engine during the pressure buildup, within limited volume, into the fuel supply system in case of motor vehicles this volume is drawn back to the vehicles tank. Such scales have been shown to be of disadvantage in that they have to be always refilled and a continuous measuring process is not possible thereby.

Measuring apparatuses are often used for continuous measuring which take volumetric measurements of the fuel flow. The used-up fuel mass is determined therein by means of an additional density measurement which represents the actually required quantity to be measured. Direct measurement of mass consumption, which avoids the disadvantage of an additional density measurement, can be presently realized only intermittently through the weighing method and continuously with Cajoles sensors.

Modern internal combustion engines require for proper operation defined and flow-dependent pressure conditions mostly in the fuel delivery line as well as in the possibly existing fuel return line.

According to the Austrian Utility Model No. 3,350, there is provided a pressure stabilization device for stabilization of the initial pressure of the mass flow sensor to be able to create the required low and constant pressure at the connection point to the consumer (generally a few milliards). In fact, the flow-dependent pressure drop at the mass flow sensor must be variably compensated (up to 2 bars, for example). In particular, highly frequent, erratic or pulse-like drawing of fluid must be quickly taken into consideration.

In the above-mentioned continuous method of fuel measuring, a pressure regulator is attached upstream from the actual flow sensor for pressure stabilization whereby the pressure regulator adjusts the flow-dependent pressure at the output of the measuring system to a constant exit pressure. The disadvantage of such a design is that conventional mechanical pressure regulators act like a "hydraulic diode," which is to say that the flowing medium can flow through the regulator only in one direction, namely downstream. A measuring system designed with such a pressure regulator does not represent an open system. Should fuel have to be returned from the injection system into the measuring system—or should there occur thermal expansion of fuel through the increase in temperature by a consumer that has stopped running—then there develops often an inadmissibly high pressure increase in the fuel system, depending on the elasticity of the lines, which stresses the lines and the built-in devices and which must be compensated possibly by costly pressure compensating devices.

It was the object of the present invention to provide a method and a device that ensures continuous, accurate, timely and highly discriminating consumption measuring with regulated exit pressure for the fluid, and which permits a return flow of at least short duration and also temperature-related expansion of the fluid.

SUMMARY OF THE INVENTION

The inventive method is characterized for the achievement of this object in that fluid is guided into the pressure regulator upon exceeding a discretionary pressure level. The return flow or the volume change of the fluid to be measured can be compensated thereby without a large effort in terms of equipment and technological methods.

According to an advantageous embodiment example of the invention, a volume of fluid is conducted into the pressure regulator whereby this volume corresponds to the volume causing the increase in pressure. It is ensured thereby that the measurement results are not influenced since the exact volume captured in the pressure reservoir has already passed the flow sensor.

To protect the system against any danger of damage through undue pressure increase, it is advantageously proposed according to the invention that an additional Volume of fluid exceeding the maximum volume that can be moved into the pressure regulator, creating pressure increase, is diverted.

The pressure regulator described above is inventively characterized for achievement of the object above in that it contains a catch volume. The already necessary pressure regulator is used at the same time as a compensating vessel along with the advantage of the simple design of the system and a system that can also be retrofit ted in a simple manner. The temporarily pushed-back volume or the volume enlarged by temperature-related expansion was already considered in the flow measurement based on the arrangement of the pressure regulator with its compensating volume being behind the flow sensor.

The compensating volume in the pressure regulator can be formed in a structurally simple manner and in a way that does not negatively influence the function of the pressure regulator in that the pressure regulator is provided with a concave diaphragm having a deflection capability. Of course, the catch volume is also biased by an elastic element, preferably a compression spring. In case of the concave diaphragm, the pressure-regulator spring also takes care of emptying the compensating volume as soon as the pressure diminishes or as soon as the volume becomes smaller or is moved by suction by the consumer.

The effect of the change of the spring constant at larger deflections can be advantageously avoided in an embodiment of the invention in which the catch volume is biased by compressed air having a controllable pressure.

According to an additional characteristic of the invention, a safety valve can be provided downstream from the sealing element of the pressure regulator whereby it is ensured that no inadmissible or dangerous values can appear even at a pressure increase that may deviate to be higher than in normal operation or at an increase of volume exceeding normal operation.

If in an advantageous embodiment of the pressure regulator, the safety valve is closed by a sealing element, which is biased in the closing direction with compressed air at the same pressure as the one in the catch volume, then automatic adjustment of the safety valve relative to the set system pressure occurs, which means, secure locking in the closed position of the valve in the range of the normally adjustable volume changes.

According to an advantageous embodiment of the invention, the compressed air connection to the safety valve can be blocked by means of a sealing element connected to the concave diaphragm to achieve automatically a freeing of the safety valve in a simple and operationally safe manner.

The above-described pressure regulator is advantageously and preferably used in an inventive device for continuous measuring of dynamic fluid consumption, particularly of fuel.

The invention will be described in more detail in the following description with the aid of an embodiment example and in reference to the accompanying drawings.

DETAILED DESCRIPTION OF THE PREFERRED EMBODIMENT

Figure 1:
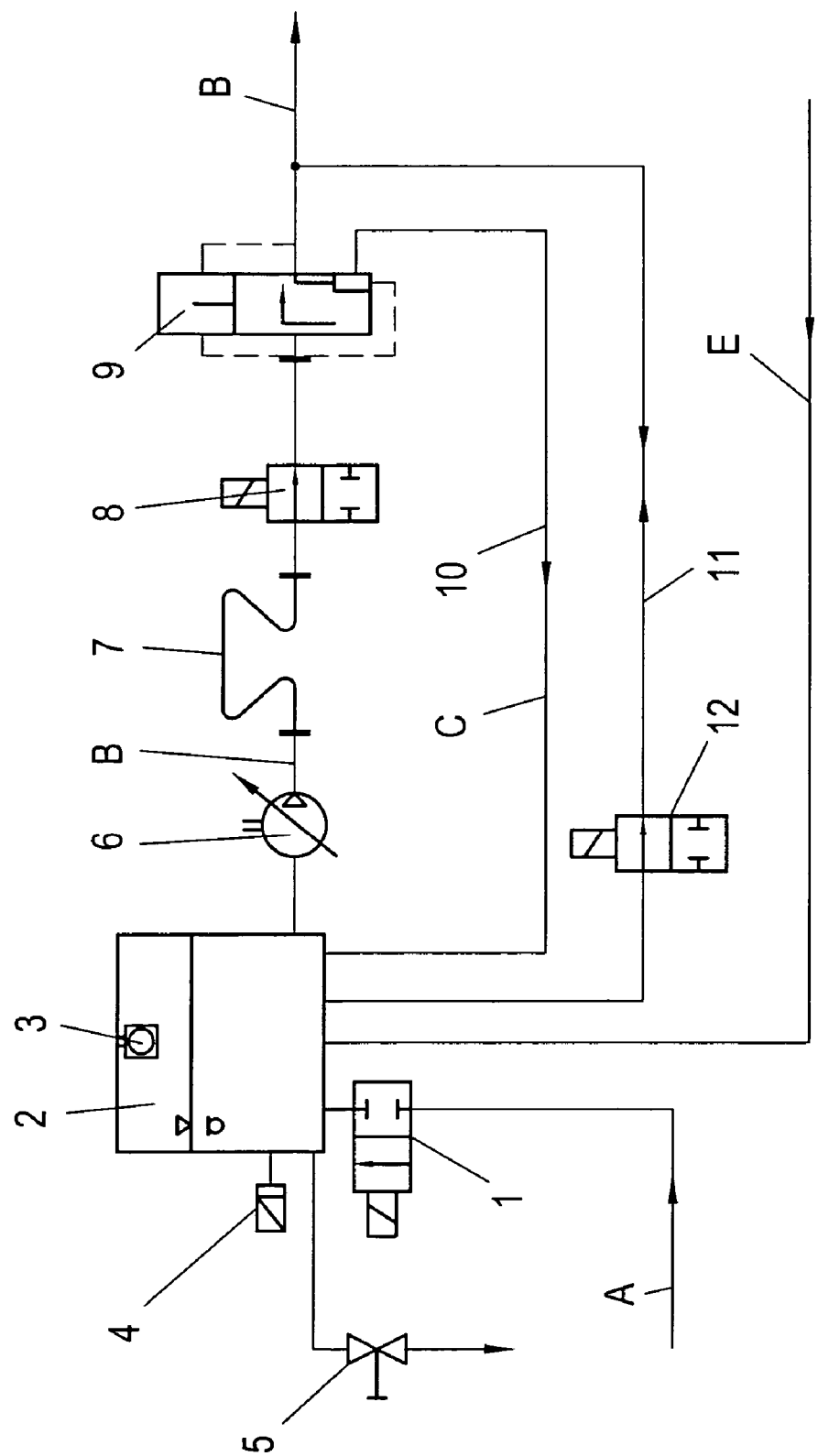
FIG. 1 shows thereby a schematic diagram of a system for continuous measuring of fuel consumption.

A tank 2, being a reservoir, is supplied with fluid, namely fuel, through a line A and a preferably electron-magnetically operable fill valve 1. The tank 2 is further provided with a float switch or overflow 3, a fuel level sensor 4, as well as a preferably manually operable drain valve 5.

Fuel is delivered from the tank 2 by means of a preferably adjustable fuel pump via a line B to the continuously operating flow sensor 7, preferably a Coriolis sensor. The fuel subsequently reaches the delivery point via an electropneumatically operable shutoff valve 8 in line B onto which the engine is connected as consumer (not illustrated) and on which delivery point the fuel is to be available under a specific present pressure.

A pressure regulator 9 is inserted behind the shutoff valve 8, which adjusts the pressure in line B behind the flow sensor 7 corresponding to an adjustable preset value whereby the pressure is the delivery pressure to the consumer. As it is explained in the following, especially with respect to FIG. 3, the pressure regulator is able to take on a specific amount of fluid which is returned by the consumer through line B or it is able to accommodate an increase in volume which is caused by the temperature related expansion of the fluid in the system.

An additional line 10 can be advantageously provided between the pressure regulator 9 and the tank 2 whereby the line 10 starts from a possible safety valve on the pressure regulator and which safely carries fuel volumes into the tank 2, which exceed the volume that can be taken up by the pressure regulator 9.

An additional line 11 can branch-off from line B between the pressure regulator 9 and the delivery point to the consumer and it can lead back to the tank 2 as well via an electron-pneumatically switch able venting/bypass valve 12.

A venting process inside the device can be realized thereby when the valve 12 is turned on. Provisions for an additional fuel return line E makes venting of the fuel lines possible up to the consumer whereby the fuel return line E ensures a direct connection between a possibly existing return line of the consumer and the tank 2.

Figure 2:
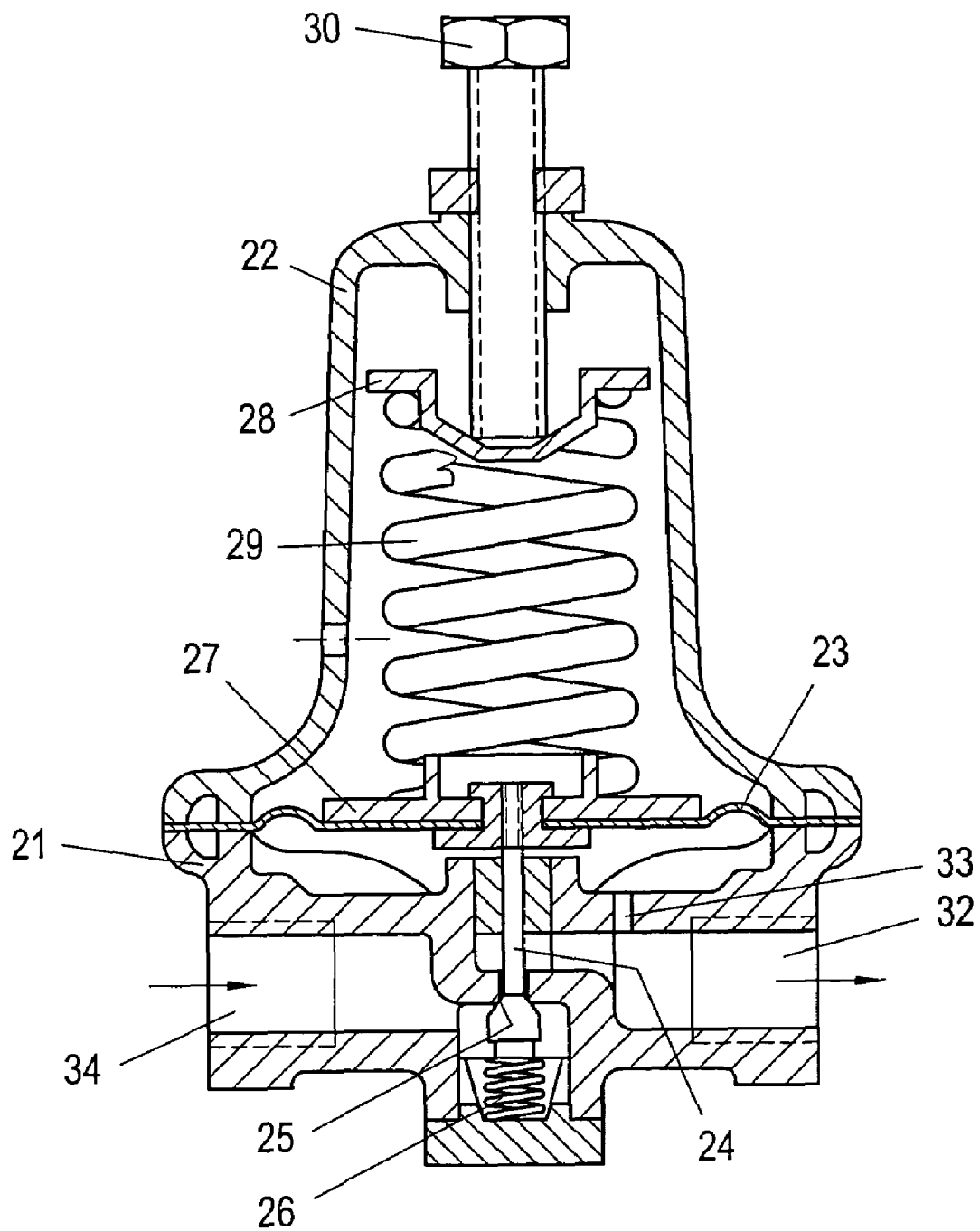
FIG. 2 shows a pressure regulator according to the state-of-the-art in a sectional view.

A traditional pressure regulator, as it was used up to now in systems described above, is illustrated in FIG. 2 in a sectional view. A diaphragm 23 is clamped between a lower housing 21 and an upper housing 22 whereby the diaphragm 23 acts upon a valve element 25 via a tappet 24 and whereby the valve element 25 is biased by a closing spring 26. A reinforcement plate 27 abuts the diaphragm 23 whereby the spring 29 is captured in compression between the reinforcement plate 27 and the adjustable support element 28, and whereby the spring 29 permits adjustment of the desired pressure by means of the adjustment screw 30. The fluid pressure at the output 32 of the pressure regulator effects, via a boring 33, the side of the diaphragm 23 disposed opposite of the spring 29. When the fluid pressure at the output 32 exceeds thereby a value determined by the force of the spring, the diaphragm 23 is lifted from the tappet 24 and the valve element 25 is urged to a closed position by the closing spring 26. If the pressure decreases, in contrast, then the spring 29 pushes the diaphragm 23 downwardly whereby the valve element 25 is lifted from the seat by the tappet 24. A connection is thereby also established between the input 34 of the pressure regulator and its output 32 so that fluid can be replenished and increase the pressure at the output-side to such a degree until the diaphragm 23 is pushed up against the force of the spring 29 and until the valve element 25 has reached again the closed position.

If, however, the pressure becomes too great at the output 32 of the pressure regulator while the valve element 25 is closed—or if the fluid is pushed back into the pressure regulator through the output 32—then the diaphragm 23 can deflect only to a small degree and the pressure will continuously increase or, otherwise, it must be compensated by additional built-in devices in the system.

Figure 3:
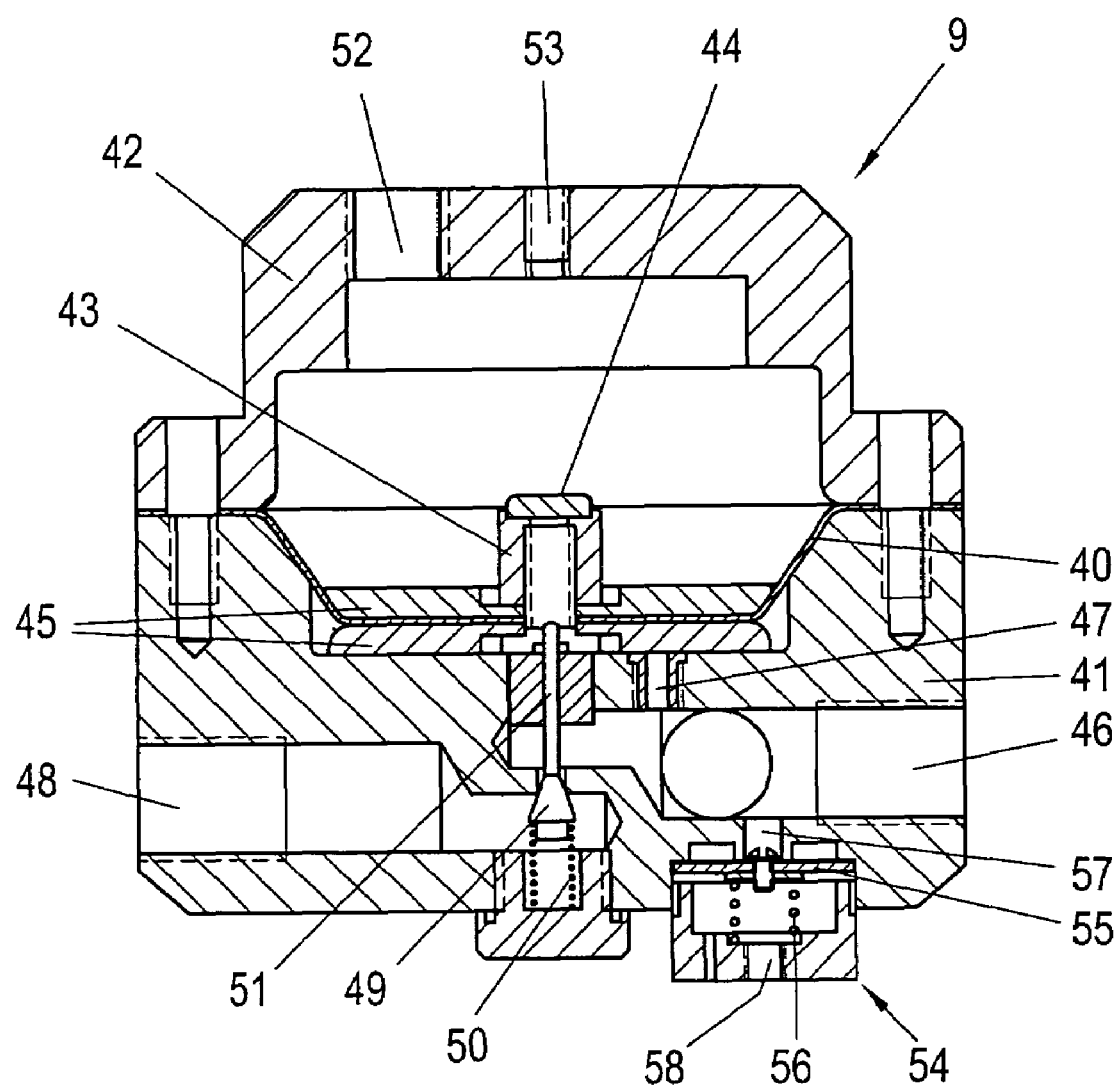
FIG. 3 shows a pressure regulator according to the invention in a sectional view as well.

In the pressure regulator of the invention illustrated in FIG. 3, there is also a diaphragm 40 clamped between a lower housing 41 and an upper housing 42. This diaphragm 40 is preferably a concave diaphragm, which can be deflected to a great degree compared to a flat diaphragm, preferably so far until a sealing element 43 connected to the diaphragm 40 makes contact with the upper side of the upper housing 42. The sealing element 43 is preferably attached with its sealing surface 44 on the upper one of the two reinforcement plates 45. A considerable volume of fuel can be accommodated in the housing of the pressure regulator 9 through the deflection of the concave diaphragm 40 whereby the volume can be pushed back through the output 46 and the boring 47 under the diaphragm 40.

The pressure regulator 9 of the invention operates also like the traditional pressure regulator described above whereby communication between the input 48 and the output 46 is controlled by the valve element 49 dependent on the pressure at the output 46 of the pressure regulator 9. As explained above, the valve element 49 is biased by the closing spring 50 in the closing direction and brought to the open position through the diaphragm 40 by means of the tappet 51 when the pressure at the output 46 drops below a value that is defined by the force acting upon the diaphragm 40 from above. The force onto the diaphragm 40 can be generated by means of an adjustment spring, as in the case of traditional pressure regulators. However, the force in the invention is generated advantageously by means of compressed air, independent from any deflection, and which preferably flows continuously through the boring 52 into the upper housing 42 and flows out again through the boring 53.

A safety valve 54 is provided at the side of the output to securely take care of the increased volume or pressure at the output side of the pressure regulator 9 exceeding the deflection of the concave diaphragm 40. The valve element 55 of the safety valve 54 is biased by a closing spring 56 and it keeps closed in normal operation the pressure relief passage 57 extending from the output 46 of the pressure regulator. In the embodiment illustrated in FIG. 3, the compressed air flowing from the boring 53 in the upper housing is guided to an in-flow boring 58 in the safety valve 54 to securely maintain the closed position at any pressure set at the output-side. Any selected pressure setting that is above the pressure level of the compressed air biasing the diaphragm is automatically forwarded to the safety valve 54 whereby this pressure level effects also the valve element 55 in addition to the force of the closing spring 56.

When the compensating volume, which is determined by the deflection of the concave diaphragm 40, is completely filled, the sealing surface 44 rests against the inner side of the boring 53 by forming a seal at full deflection and prevents the out-flowing of compressed air from the upper housing 42 all the way to the safety valve 54. The closing element 55 of said safety valve 54 is biased alone by the closing spring 56 and the safety valve 54 can open as soon as the thereby defined maximum pressure has been reached at the output of the pressure regulator 9. The pressure relief passage 57 is advantageously connected to the tank 2 of the system through line 10 as indicated in FIG. 1.

The invention claimed is:

1. A pressure regulator comprising a housing which includes an upper housing part and a lower housing part, said upper and lower housing parts defining an internal chamber therebetween, said lower housing part furthermore defining an inlet channel, an outlet channel and a valve channel therebetween, a flexible diaphragm mounted inside said housing for dividing said internal chamber into a variable volume upper chamber and a variable volume lower chamber, said flexible diaphragm biasing a movable valve element to open said valve channel when said flexible diaphragm moves downwardly to enlarge said upper chamber and shrink said lower chamber, and to close said valve channel when said flexible diaphragm moves upwardly to shrink said upper chamber and enlarge said lower chamber, first biasing means for biasing said valve element to close said valve channel when said flexible diaphragm moves upwardly and second biasing means for biasing said valve element to open said valve channel when said flexible diaphragm moves downwardly, and a bore in said lower housing part to connect said outlet channel with said lower chamber, such that a back flow of pressurized fluid medium into said outlet channel will flow through said bore into said lower chamber to move said flexible diaphragm upwardly to close said valve channel, said flexible diaphragm being upwardly flexible after the valve element closes the valve channel to provide a compensating volume for storage of back flowing pressurized fluid medium, and wherein said upper housing part defines an inlet bore for delivering compressed fluid medium into said variable volume upper chamber and an outlet bore for removing said fluid medium from said upper chamber.

2. A pressure regulator according to claim 1, wherein said second biasing means comprises compressed fluid medium in said upper chamber.

3. A pressure regulator according to claim 1, wherein said first biasing means is a compression spring.

4. A pressure regulator according to claim 1, including a safety valve in communication with said outlet channel.

5. A pressure regulator according to claim 4, wherein said safety valve includes a valve element and a third biasing means to bias the valve element in a closing direction.

6. A pressure regulator according to claim 5, including a supply line which connects the outlet bore of the upper housing part with the safety valve to help bias the valve element in a closing direction.

7. An apparatus for continuously measuring dynamic fluid consumption comprising a tank, a continuously-operating flow sensor for fluid, and a fluid pressure regulator between the fluid flow sensor and a fluid consumer, said pressure regulator comprising a housing which includes an upper housing part and a lower housing part, said upper and lower housing parts defining an internal chamber therebetween, said lower housing part furthermore defining an inlet channel, an outlet channel and a valve channel therebetween, a flexible diaphragm mounted inside said housing for dividing said internal chamber into a variable volume upper chamber and a variable volume lower chamber, said flexible diaphragm biasing a movable valve element to open said valve channel when said flexible diaphragm moves downwardly to enlarge said upper chamber and shrink said lower chamber, and to close said valve channel when said flexible diaphragm moves upwardly to shrink said upper chamber and enlarge said lower chamber, first biasing means for biasing said valve element to close said valve channel when said flexible diaphragm moves upwardly and second biasing means for biasing said valve element to open said valve channel when said flexible diaphragm moves downwardly, and a bore in said lower housing part to connect said outlet channel with said lower chamber, such that a back flow of pressurized fluid medium into said outlet channel will flow through said bore into said lower chamber to move said flexible diaphragm upwardly to close said valve channel, said flexible diaphragm being upwardly flexible after the valve element closes the valve channel to provide a compensating volume for storage of back flowing pressurized fluid medium, and wherein said upper housing part defines an inlet bore for delivering compressed fluid medium into said variable volume upper chamber and an outlet bore for removing said fluid medium from said upper chamber.

8. An apparatus according to claim 7, including a conditioning system for the fluid.

9. An apparatus according to claim 7, including a pump for the fluid.

10. An apparatus according to claim 7, wherein the flow sensor is a Coriolis sensor.

11. A pressure regulator according to claim 1, wherein said flexible diaphragm is concave.

12. An apparatus according to claim 7, wherein said flexible diaphragm is concave.

* * * * *